United States Patent [19]
Domokos et al.

[11] 3,716,473
[45] Feb. 13, 1973

[54] METHOD AND APPARATUS FOR COATING METAL WORKPIECES WITH WATER SOLUBLE OR COLLOIDAL COLORING MATTER EMULSIFIED IN WATER

[76] Inventors: Jozsef Domokos, 67, Tancsics u., Budapest XIX; Gyorgy Benedek, 35 Ringlo u., Budapest XXII; Bela Kiss, 8, Mecset u., Budapest II; Laszlo Winkler, P.O. Box 36, Nap u., Budapest XVIII; Zoltan Beller, P.O. Box 78/a, Nemetvologyi u., Budapest XII, all of Hungary

[22] Filed: June 21, 1971

[21] Appl. No.: 155,199

Related U.S. Application Data

[62] Division of Ser. No. 698,273, Jan. 16, 1968.

[30] Foreign Application Priority Data

Jan. 20, 1967 Hungary..............................DO-310

[52] U.S. Cl....................................204/299, 204/181
[51] Int. Cl............................B01k 5/02, C23b 13/00
[58] Field of Search......................204/181, 299, 300

[56] References Cited

UNITED STATES PATENTS 2,215,144  9/1940  Clayton et al. ........................204/181
3,305,467  2/1967  Igras et al. ............................204/181
3,335,103  8/1967  Huggard et al. ....................204/181 X
3,355,373  11/1967 Brewer et al. .........................204/181
3,418,225  12/1968 Wick et al. .............................204/181
3,444,064  5/1969  Johnson ................................204/181

Primary Examiner—John H. Mack
Assistant Examiner—A. C. Prescott
Attorney—Blum, Moscovitz, Friedman & Kaplan

[57] ABSTRACT

A method and apparatus for coating metal workpieces with coloring matter. The metal workpieces which are continuously coated, one after the other, are connected into an electrical circuit to form an anode thereof, and they are advanced sequentially through a solution which has either water soluble coloring matter or colloidal coloring matter emulsified in water. This solution is contained in a vessel which forms a cathode of the electrical circuit, and a coulometer-integrator-regulating means coacts with an anode bar which is connected to the workpiece for sensing a time impulse and a current-amount impulse. A supply means is provided for supplying the solution of coloring matter to the vessel, and a valve means coacts with this supply means for controlling the flow of coloring matter therefrom to the vessel, this valve means being actuated by an actuating means which is operatively connected with the coulometer-integrator-regulating means to be regulated thereby for maintaining constant the concentration of coloring matter in the solution in the cathode-forming vessel.

2 Claims, 1 Drawing Figure

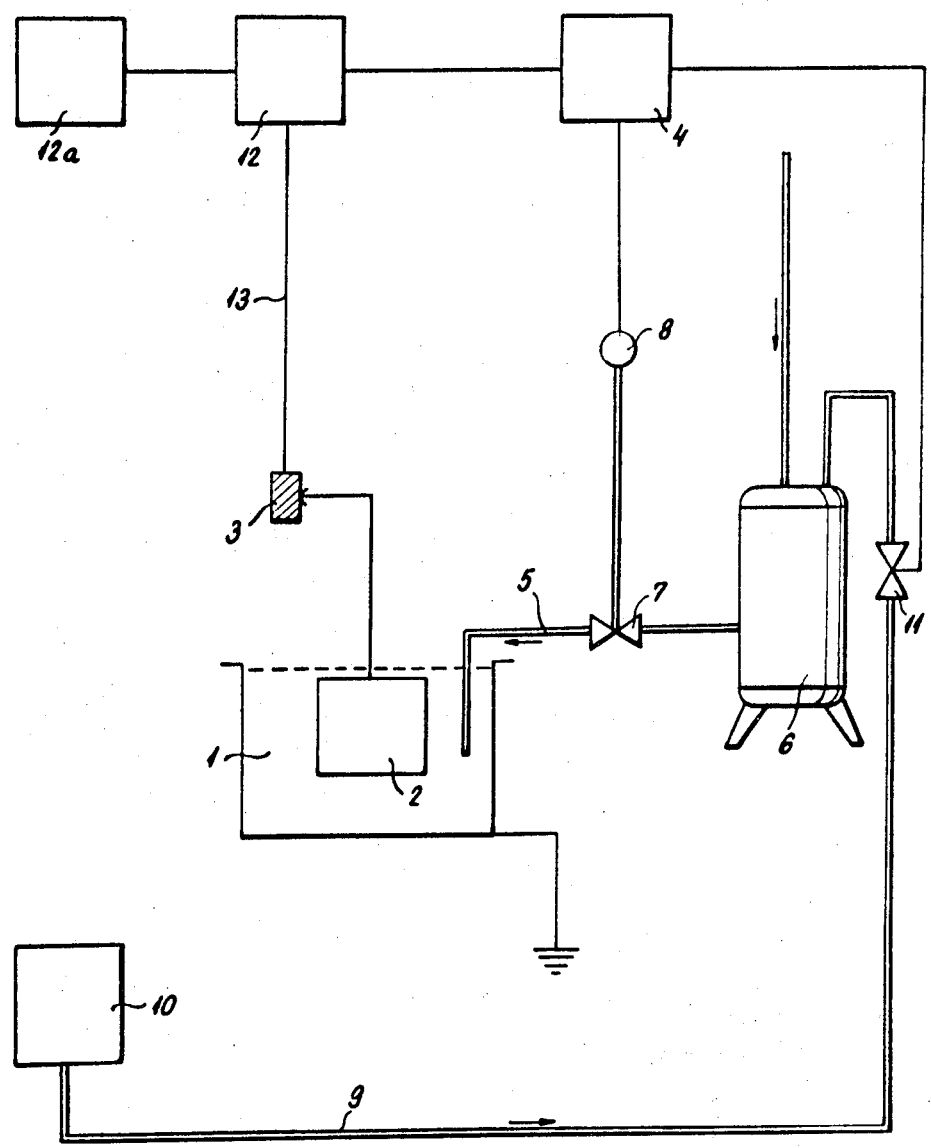

METHOD AND APPARATUS FOR COATING METAL WORKPIECES WITH WATER SOLUBLE OR COLLOIDAL COLORING MATTER EMULSIFIED IN WATER

This is a division of application Ser. No. 698,273, filed Jan. 16, 1968.

BACKGROUND OF THE INVENTION

The present invention relates to a method and apparatus for the common, continuous, sequential coating of metal workpieces with water soluble or colloidal coloring matter emulsified in water.

The common continuous sequential coloring of metal workpieces with water soluble coloring matter or coloring matter emulsified in water in a colloidal condition has been carried out in a known way by electrophoresis. During the progess of a method of this latter type the particles of coloring matter which are suspended in water are provided with an electrical charge so as to bring about transference of these charged coloring particles to the metal workpiece which is to be coated and which forms the anode of the electrical circuit. In the known methods and apparatus for this purpose the workpieces are maintained in the vessel which contains the coloring matter only for a length of time sufficient for the coloring matter to become deposited upon the workpiece as a result of electrophoresis. The disadvantage of the known method and apparatus resides in the fact that the driving out of the water from the outer surface of the layer of coloring matter takes place in the open air. As a result, there is in addition to the expenditure of a considerable amount of energy the disadvantage of achieving only a colored exterior surface which is highly porous as a result of the vaporization of the water molecules.

A further disadvantage resides in the fact that with the electrophoresis methods known up to the present time a relatively long period is required for drying and programming of the current intensity cannot be carried out. The most significant disadvantage of the known methods and apparatus resides, however, in the fact that because of the consuming of the coloring matter from the solution the concentration thereof undergoes a very substantial change.

SUMMARY OF THE INVENTION

It is accordingly a primary object of the present invention to provide a method and apparatus which will avoid the above drawbacks.

In particular it is an object of the invention to provide a method and apparatus which will completely eliminate the necessity for drying operations or which will at least reduce the requirement of drying to an absolute minimum.

Also, it is an object of the invention to provide a method and apparatus which will enable the coating of workpieces with different exterior surfaces to take place at an optimum concentration of coloring matter and at an optimum current intensity.

Thus, it is an object of the invention to provide a method and apparatus which will reliably produce an entirely non-porous colored coating for metal workpieces.

In accordance with the invention the method for the common continuous coloring of metal workpieces with water soluble coloring matter or coloring matter which is emulsified in water in a colloidal condition includes the steps of connecting the metal workpieces which are to be coated into an electrical circuit as an anode thereof while immersing these metal workpieces into a coloring-matter containing solution situated within a vessel which forms a cathode of the electrical circuit.

In accordance with the invention the concentration of the coloring matter in the solution within the cathode-forming vessel is maintained constant by a coulometer-integrator-regulating means, and the metal workpiece which is to be coated is maintained in the vessel which is filled with the coloring matter until irreversible gel formation takes place where there is a maximum value of electroosmosis as indicated by an osmometer.

Thus, with the method and apparatus of the present invention the water molecules are removed after the coating by electrophoresis by way of the electroosmosis, and the concentration of coloring matter in the bath is maintained constant by way of the coulometer-integrator-regulating means. As a result the layer of coloring matter deposited on the metal workpieces will have a uniform thickness, the metal workpieces which are removed from the solution-containing vessel are not sticky, the coloring matter is not easily removed therefrom, and the water content of the coating does not exceed a value of 4 – 5 percent. During the course of the electroosmosis the water molecules which are beneath the surface of the coloring matter in the vessel remove themselves out of the deposited layer of coloring matter, so that the exterior surface of the metal workpieces which are treated with the method and apparatus of the invention, which is to say the layer of coloring matter deposited thereon do not provide any pores which can be detected even under a microscope.

The apparatus of the invention includes a supply means which supplies the coloring matter to the cathode-forming solution-containing vessel, this supply means being provided with a valve means for controlling the flow of coloring matter to the vessel, and in accordance with the invention the time impulse of the metal workpiece which is drawn through the vessel is transmitted to the valve means which is controlled by way of a coulometer-integrator-regulating means electrically connected with an anode bar which supplies current to the workpiece which thus forms an anode of the electrical circuit.

Thus, in accordance with the invention the apparatus will function to maintain the concentration of coloring matter in the cathode-forming vessel during the coating operations continously constant depending upon the form and the exterior surface of the workpiece which is to be colored, which is to say the coloring matter which is in the vessel, which is water soluble , or which is emulsified in water in a colloidal condition will undergo no dilution as a result of transfer of coloring matter to the workpiece.

The workpieces which are taken from the apparatus of the invention are completely dry and no longer have any tacky characteristics since the workpiece which is to be colored remains in accordance with the invention in the apparatus until there is maximum electroosmosis in the vessel. The reaching of maximum electroosmosis, or irreversible gel formation, is indicated by an osmometer. Thus, with the method and apparatus of the invention it becomes possible to eliminate the requirement of drying apparatus to be used after the deposition of the layer of coloring matter on the workpieces.

In another embodiment of the invention where the coloring matter-containing vessel is connected with an ion-exchanging water deionizer, the output current of the coulometer-integrator is operatively connected with a second valve means controlling the communication between the deionizer and the supply means for the coloring matter. With this arrangement the coloring matter can be conducted as desired in a correspondingly diluted condition at a constant concentration into the cathode-forming vessel.

BRIEF DESCRIPTION OF DRAWING

The method and apparatus of the present invention are illustrated by way of example in the accompanying drawing which forms part of this application and in which the primary components of the apparatus are schematically illustrated.

DESCRIPTION OF PREFERRED EMBODIMENTS

In the example illustrated the vessel 1 is filled with a water soluble coloring matter or with a coloring matter which is emulsified in water in a colloidal condition. A conveyor means is provided for conveying the workpiece 2 which is to be colored to the vessel 1 to be immersed in the solution therein while being drawn therethrough. This vessel 1 forms a cathode of the electrical circuit illustrated, while the workpiece 2 which is to be coated with the coloring matter is connected in the form of an anode to the source of current. The workpiece 2 which is to be connected into the circuit as an anode is provided with current from an anode bar 3 through suitable conductors which are in electrically conductive connection with the bar 3.

A coulometer-integrator-regulating means 4 is electrically connected with the anode bar 3 for sensing the time impulse of the coloring operations and the impulse of the amount of current. A supply means 6 communicates through a conduit 5 of the supply means with the vessel 1 for supplying coloring matter thereto, and the flow of the coloring matter is controlled by a valve means 7 which is actuated by an actuating means 8 which is in turn connected to the sensing means 4 so as to be regulated thereby. Thus, the control current derived from the sensing means 4 will control the actuating means 8 so as to regulate the operation of the valve 7 in order to maintain a constant concentration of coloring matter in the solution in the vessel 1.

The supply means 6 communicates through a conduit 9 with a water deionizer 10, and this conduit 9 is provided with a second valve means 11 which is also controlled by the output circuit of the current sensing means 4.

The constant current intensity, which is plays an important role during the course of the coloring process, is assured by way of a current source 12 provided with a stabilizer 12a. The current source 12 is electrically connected to the anode bar 3 through a conductor 13. The other pole of the current source 12 is connected through ground with the vessel 1 which forms the cathode of the circuit.

In accordance with the invention, the vessel 1 is filled during the progress of the method with the water soluble coloring matter or the coloring matter which is emulsified in water through the conduits 5 or 9 from the supply means 6 or the dionizer 10. The workpiece-conveying means transports the workpieces 2 which are suspended therefrom into the solution in the vessel 1 to be immersed therein so that the workpieces are immersed within the solution of coloring matter. The workpieces 2 are in electrical contact with the anode bar 3 by way of the electrical conductors guided over the vessel 1 into electrical contact with the anode bar 3 to have electrical communication therewith. As soon as a workpiece has been immersed within the solution in the vessel 1, the time-and-current-intensity sensing means of the coulometer-integrator 4 receives an impulse from the anode bar 3. If the coloring matter in the vessel 1 should become diluted, the sensing means 4 delivers a signal or impulse to the actuating means 8 of the valve means 7 of the supply means 6, so that in this way the required amount of coloring matter will flow through the conduits 9 or 5 into the vessel 1. As soon as the coloring matter has achieved the preselected concentration the sensing means 4 terminates the supply of coloring matter.

The speed with which the workpieces are moved by the transporting means is regulated in such a way that the workpieces which are to be coated remain in the vessel until maximum electroosmosis is achieved. The attainment of maximum electroosmosis is indicated by an osmometer. In the event that workpieces of different sizes are to be coated, the workpieces are divided into groups in each of which the workpieces have approximately the same size, and the current which is required for the coating of the workpieces in the different groups is derived at the required intensity by way of the anode bar 3. In this case the apparatus is of course provided with a plurality of different current-conducting anode bars 3.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a mater of language, might be said to fall therebetween.

What is claimed is:

1. In an apparatus for coating metal workpieces with water soluble or colloidal coloring matter emulsified in water, a vessel for containing the solution of coloring matter, an electrical circuit into which said vessel is connected as a cathode, supply means communicating with said vessel for supplying the latter with coloring matter, valve means coacting with said supply means for controlling the flow of coloring matter therefrom to said vessel, an anode bar forming part of said electrical circuit and operatively connected with a metal workpiece passing through a solution in said vessel so that the workpiece forms an anode of the electrical circuit, actuating means coacting with said valve means for actuating the latter, and coulometer-integrator-control means coacting with said anode bar for sensing a time impulse and a current-amount impulse, and said coulometer-integrator-regulating means also being operatively connected with said actuating means for controlling the latter to control the operation of said valve means for maintaining constant the concentration of coloring matter in the solution in said vessel.

2. The combination of claim 1 and wherein an ion-exchanging water deionizer is operatively connected with said supply means, second valve means controlling communication between said deionizer and said supply means, and said coulometer-integrator-regulating means having an output control current operatively connected with said second valve means for controlling the latter.

* * * * *